Feb. 7, 1967
J. L. TVETEN
3,303,212
SYNTHESIS OF AROMATIC PLASTICIZERS FROM DITOLYLMETHANE
Filed June 10, 1964
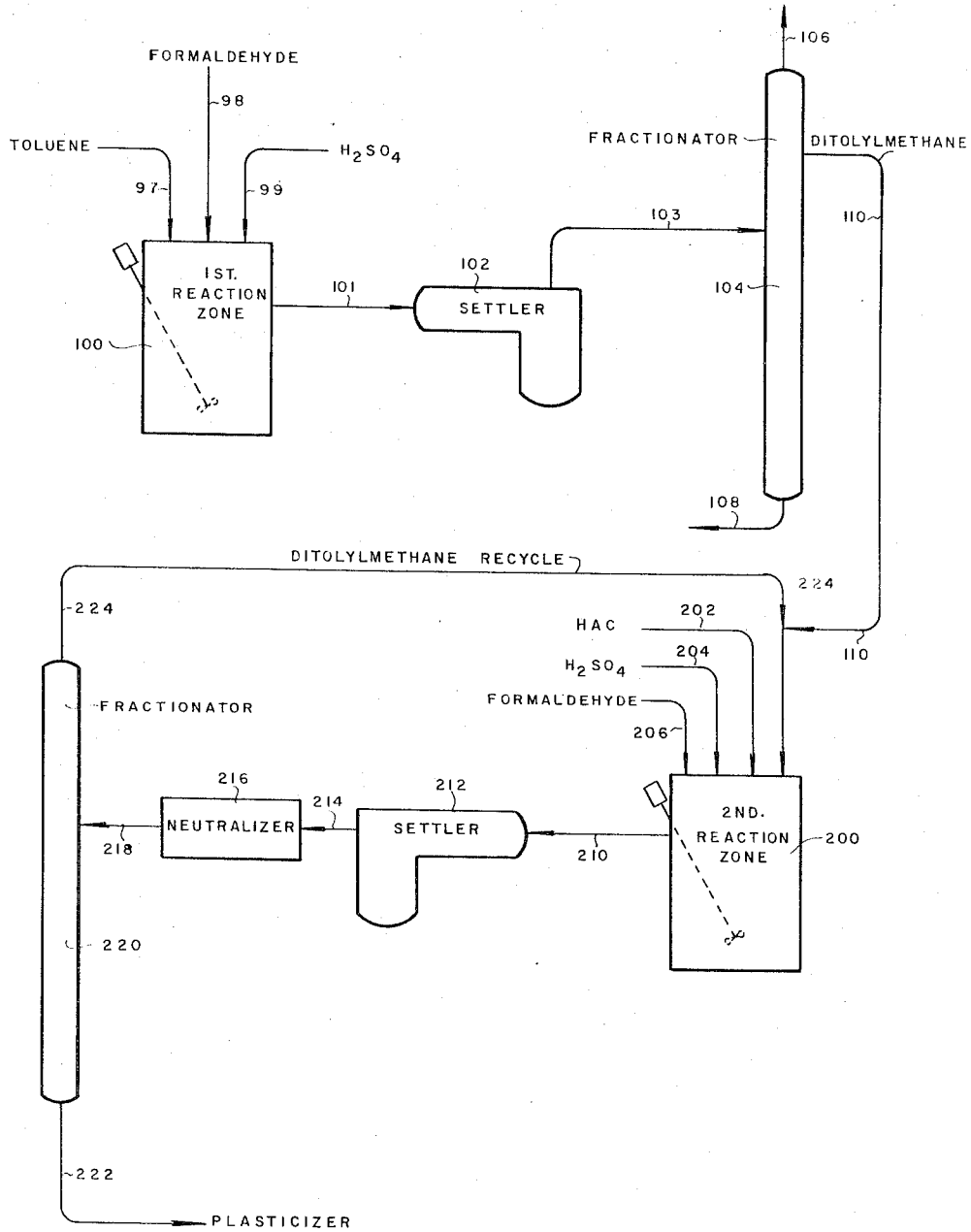
INVENTOR.
JOHN L. TVETEN,
BY
ATTORNEY.

United States Patent Office 3,303,212
Patented Feb. 7, 1967

3,303,212
SYNTHESIS OF AROMATIC PLASTICIZERS FROM DITOLYLMETHANE
John L. Tveten, Baytown, Tex., assignor, by mesne assignments, to Esso Research and Engineering Company, Elizabeth, N.J., a corporation of Delaware
Filed June 10, 1964, Ser. No. 373,983
4 Claims. (Cl. 260—494)

The present invention relates to the production of plasticizing oils for use in floor tile. More particularly, the present invention relates to the production of a tile plasticizer having an increased ester-to-hydrocarbon ratio, whereby higher efficiency can be obtained in a non-staining plasticizer.

It has been found that by the condensation of toluene with formaldehyde in the presence of acetic and sulfuric acid, an admixture of products is obtained which, upon fractionation, finds utility as a non-staining plasticizer used in polyvinyl chloride floor tile. Upon investigation of the plasticizer, it was found that the esters in the admixture were responsible for most of the plasticizing action, and a good bit of the plasticizer action was attributable to a single ester: ditolylmethanemethylol acetate:

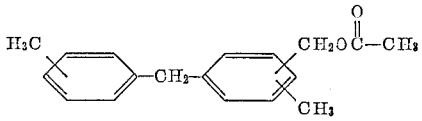

plasticizer must be compatible with the polyvinyl chloride. That is, the polyvinyl chloride must accept without weeping enough of the plasticizer to allow the plasticizer to be effective. Secondly, the plasticizer must have an efficiency sufficient to impart to the polyvinyl chloride the desired flexibility without the incorporation of excessive amounts of the plasticizer. Although the plasticizers generally in use are not particularly stain resistant, this quality is highly desirable and is, in fact, provided by the plasticizer produced by the present invention.

In choosing a stain resistant plasticizer, both the efficiency of the plasticizer and its resistance to staining must be correlated. Staining of floor tile takes place mostly within the plasticizer incorporated in the tile; the more plasticizer that is present, the greater the amount of staining bodies that will be absorbed by the tile. Further, some plasticizers are more susceptible to staining than others, so that at equal efficiencies one plasticizer may contain within itself more staining bodies than any second plasticizer. Of the plasticizers currently being used in polyvinyl chloride floor tile, the ones used in the largest amounts are dioctyl phthalate (DOP), butylbenzyl phthalate (DBP), and ditetrahydrofurfural phthalate (DTHFP).

The properties of these various plasticizers are compared in the following Table I was the properties of plasticizer oil obtained from toluene-formaldehyde condensation and with the properties of the ditolylmethane-methylol acetate constituent which is maximized in the product of the present invention.

TABLE I.—PLASTICIZER COMPARISONS [1]

| Plasticizer | DOP | BBP | DTHFP | I(C-F)[2] | Ditolylmethane-methylol Acetate |
|---|---|---|---|---|---|
| Efficiency: | | | | | |
| 100% Modulus, p.s.i. | 1,735 | 1,870 | 2,560 | 2,925 | 1,910 |
| Shore A hardness | 84 | 83 | 93 | 94 | 82 |
| Staining: [3] | | | | | |
| Yellow Dye | 10 | 7 | 5 | 5 | 3 |
| Brown Dye | 10 | 7 | 4 | 3 | 2 |
| Staining: [4] Asphalt | 4 | 3 | 0–1 | 0–1 | 2 |
| Volatility: | | | | | |
| Carbon Black Volatility, percent | 1.3 | 2.5 | 1.1 | 3.1 | 10.2 |
| Processing loss of plasticizer, percent | | | | | ~2 |

[1] Formulation: 50 parts per hundred by weight (p.h.r.) of plasticizer in clear polyvinyl chloride (PVC).
[2] Compounds C–F of Example 1.
[3] Code: 0=No staining; to 10=Heavy staining.
[4] Code: 0=None; 1=Very slight; 2=Slight; 3=Light; 4=Moderate; 5=Heavy staining.

The object of the present invention is to provide a method of increasing the content of esters in the condensation product, particularly in optimizing the amount of ditolylmethanemethylol acetate.

Suprisingly it has been found that by condensing ditolylmethane in the presence of formaldehyde, glacial acetic acid, and sulfuric acid, high selectivity towards the formation of ditolylmethanemethylol acetate is obtained, and that by limiting the reaction time to a period of 1 to 4 hours, this selectivity can be maintained. The formation of hydrocarbons other than the ditolylmethane feedstock is minimized, and by simple fractionation a plasticizing oil boiling over 200° C. (at 20 mm. Hg pressure) can be obtained which has an ester-to-hydrocarbon ratio greater than 3.5, as compared to an ester-to-hydrocarbon ratio of around 2.5 obtainable in the condensation of toluene with formaldehyde.

Plasticizers for use in the manufacture of polyvinyl chloride floor tile must have a number of characteristics which are peculiarly adapted for such use. First, the As is seen from Table I, the ditolymethanemethylol acetate is higher in efficiency than DTHFP, roughly equivalent to BBP, and only slightly less efficient than DOP. However, its stain resistance is much superior to DOP and BBP, while being roughly equivalent to DTHFP in stain resistance, but is considerably cheaper.

Thus, the present process finds great utility in the production of a polyvinyl chloride plasticizer of high efficiency, good stain resistance, and low cost.

In the condensation reaction of the present invention, the reactants are ditolylmethane, formaldehyde, and acetic acid, with sulfuric acid being used as a catalyst.

The reaction may be carried out batchwise or continuously, admixing the reactants in a reaction zone at a temperature of 75° C. to 150° C. and a pressure chosen generally to maintain the reactants under reflux conditions, although the pressure is not critical and reflux conditions are chosen only to minimize the problems of temperature control. The reaction time is chosen within the range of 1 to 4 hours. At a time less than 1 hour, conversion of the feed is not sufficient to make the process commercially feasible, whereas, after 4 hours residence time, further conversion is almost exclusively directed to the formation of polynuclear hydrocarbons, at the expense of ester formation. Thus, the ester-to-hydrocarbon ratio reaches a maximum at about 4 hours residence time and thereafter decreases.

The ditolylmethane may be obtained by the condensation of toluene with formaldehyde in the presence of an acid catalyst, as is described in the patent literature. For example, the preparation of ditolylmethane is described in United States Patents 2,850,545, issued to Lloyd C. Fetterly et al.; 2,879,312, issued to Lloyd C. Fetterly; and 2,761,884, issued to Koorevar. The acid system may also comprise an admixture of sulfuric acid and acetic acid, and the ditolylmethane may be recovered by distillation, containing only small amounts of esterified product.

The formaldehyde reactant is employed either as a solid (paraformaldehyde, trioxane, etc.), a liquid (Formalin), or as a gas. In order to facilitate handling and to avoid dilution of the sulfuric acid, paraformaldehyde having a molecular weight of 180 ot 3,000 is preferred. From 0.5 to 2.0 parts of formaldehyde per molar part of ditolylmethane are employed. Preferably 1 mol of formaldehyde per mol of ditolylmethane is employed.

Acetic acid is utilized preferably in the glacial form to avoid dilution of the sulfuric acid catalyst. Up to about 5% water in the acetic acid may be tolerated, however, by adjustment of the weight concentration of the sulfuric acid to operate at around 70 weight percent. From 0.5 to 1.5 mols of glacial acetic acid per mol of ditolylmethane are used.

Sulfuric acid catalyst is employed at a concentration of 40% to 70% by weight, the remainder being water. At concentrations below about 40%, the rate of reaction drops markedly. While in concentrations above about 70%, the color of the product deteriorates until at 98% concentration sulfuric acid, only a black intractable mass is obtained.

Reaction conditions include a temperature within the range of 75° C. to 150° C. At temperatures lower than about 75° C., the reaction rate is so slow as to be virtually negligible; whereas, above 150° C., the vapor pressure of the reaction mass makes the use of high pressure vessels necessary if reflux conditions are to be obtained.

The process of the present invention may be carried out either batchwise or continuously. In the batchwise operation, the ditolylmethane, paraformaldehyde, and acetic acid are formed in an admixture in the reaction zone, and the sulfuric acid added dropwise into the reaction mass, while maintaining conditions of agitation. In a continuous process, of course, all of the reactants will be charged simultaneously into the reaction zone. Under this flow scheme, the acid phase will contain sulfuric acid, most of the acetic acid, and most of the formaldehyde. This phase can be separated by settling and used as a recycle stream, with the concentration of sulfuric acid being maintained by replacement with fresh sulfuric acid, by distillation of the recycle stream, by flashing of a portion of the water within the stream, by azeotroping water from the reaction zone, etc. The supernatant phase, the hydrocarbon phase, will contain some acetic acid, some formaldehyde, a small amount of dissolved sulfuric acid, the hydrocarbon reactants and the hydrocarbon and ester products. This supernatant phase can be fractionated to obtain a product having a boiling range above 200° C. at 20 mm. Hg pressure. The overhead stream comprising ditolylmethane will be recycled to the reaction zone. As a matter of practice, it is desirable to water wash the separated hydrocarbon stream before introduction into the fractionating tower. The water wash may comprise a dilute caustic treatment for neutralizing any residual acidity present in the hydrocarbon phase.

The present invention may be better understood by reference to the attached drawing. Toluene, formaldehyde, and sulfuric acid are charged by lines 97, 98, and 99 into a first reaction zone 100 and maintained under conditions to optimize the production of ditolylmethane, for example, by the process shown in the Fetterly patent. The first reaction product is removed from zone 100 by line 101 and is separated by settling in settler 102, the acid phase being removed for recycle to the reaction zone by means not shown. The hydrocarbon phase is removed from the settler 102, preferably water washed and neutralized by means not shown, and charged into the fractionator 104 by way of line 103. In the fractionator 104, the first-stage reaction product is fractionated to obtain an overhead stream by way of line 106 which comprises unreacted toluene. The bottoms stream removed by way of line 108 comprises sludge and higher condensation products. A side stream is withdrawn by way of line 110, which consists essentially of ditolylmethane, which is then charged into the second reaction zone 200 along with glacial acetic acid added by way of line 202, sulfuric acid added by way of line 204, and paraformaldehyde added by way of line 206. In the reaction zone 200, the reaction mixture is maintained at a temperature of 75° C. to 150° C. and a residence time of 1 to 4 hours. The rate of addition of sulfuric acid is chosen to maintain within the reaction zone a catalyst concentration of 0.1 to 0.5 mol of sulfuric acid per mol of ditolylmethane. Under these conditions, a reaction product is obtained which is high in concentration of ditolylmethanemethylol acetate. This reaction product is withdrawn from the reaction zone 200 by way of line 210 and introduced into settler 212 where is separates into two phases. The acid phase contains sulfuric acid, formaldehyde, and acetic acid; the supernatant hydrocarbon phase containing only small amounts of acetic acid and formaldehyde, and only a trace of sulfuric acid. The supernatant hydrocarbon phase, removed by way of line 214, is preferably water washed and neutralized in zone 215, and is then charged by way of line 218 into a final fractionator 220. The fractionator 220 operates to separate the reaction product into a plasticizer bottoms stream, which has a boiling point range above 200° C. at 20 mm. Hg pressure removed by line 222, and a ditolylmethane recycle stream which is removed overhead by way of line 224.

Exemplary of the practice of the present invention, the following examples are given.

*Example 1*

Four mols (120 g.) of paraformaldehyde having a molecular weight of 180 to 3000, 3.75 mols (225 g.) of glacial acetic acid, and 4 mols (368 g.) of toluene were admixed in a reaction flask and heated to 100° C. While agitating the formaldehyde, acetic acid and toluene reaction admixture, 0.735 mol (103 g.) of 70 weight percent sulfuric acid was added to the mixture dropwise over a period of 2 hours. Dropwise addition of the sulfuric acid was continuous over this period. At the end of 2 hours, the addition of sulfuric acid was terminated and the reaction maintained for 4 more hours at 100° C. (the reflux temperature for the admixture). The pressure during the reaction was substantially atmospheric. Samples were taken at the end of 6 hours. At the end of the 6-hour reaction period, agitation was stopped and the reaction mixture separated into an acid layer and a supernatant oil layer. The oil layer was withdrawn and water washed three times with 250 cc. of water and thereafter dried over calcium chloride. The hydrocarbon samples were analyzed and the following results obtained.

TABLE II.—6-HOUR SAMPLE

| | |
|---|---|
| Toluene | 7.7 |
| A | 10.2 |
| B | 44.6 |
| C | 21.8 |
| D | 9.4 |
| E | 5.0 |
| F | 1.3 |

1 hour 26 g. (0.185 mol) of 70 weight percent $H_2SO_4$. After completion of $H_2SO_4$ addition, the reaction mixture was maintained at 100° C. under reflux conditions for an additional 5 hours. Samples were taken at 15 minutes, 30 minutes, 1 hour, 2 hours, 4 hours and 6 hours reaction times. The samples were 5 cc. each, and were water washed with 25 cc. of water and dried over calcium chloride. Analysis by gas chromatography gave the following results.

TABLE IV

| | Example 1 | Example 2 | | | | | | |
|---|---|---|---|---|---|---|---|---|
| | | Feed | 15 min. | 30 min. | 1 hr. | 2 hrs. | 4 hrs. | 6 hrs. |
| Toluene, 7.7 | | | | | | | | |
| A, 10.2 | | | | | | | | |
| B, 44.6 | | 99.8 | 99.0 | 97.7 | 92.8 | 87.7 | 76.8 | 74.6 |
| C, 21.8 | | 0.2 | 1.0 | 2.3 | 6.0 | 9.7 | 18.5 | 18.6 |
| D, 9.4 | | | | | 0.4 | 0.8 | 1.7 | 2.4 |
| E, 5.0 | | | | | 0.0 | 0.2 | 0.5 | 0.5 |
| F, 1.3 | | | | | 0.8 | 1.6 | 2.5 | 3.9 |
| Ester/Hydrocarbon, 2.4 | | | | | 5.0 | 4.1 | 4.5 | 3.0 |

As used in all tables, the Compounds A to F are as follows:

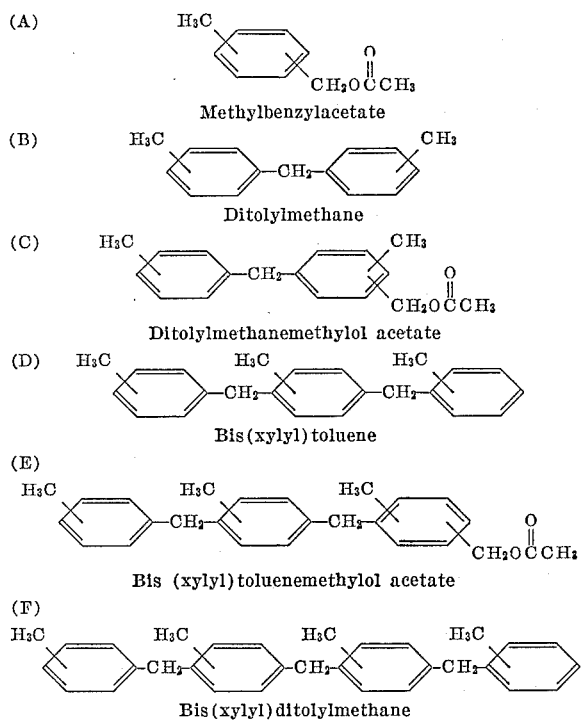

(A) Methylbenzylacetate
(B) Ditolylmethane
(C) Ditolylmethanemethylol acetate
(D) Bis(xylyl)toluene
(E) Bis(xylyl)toluenemethylol acetate
(F) Bis(xylyl)ditolylmethane The hydrocarbon layer was fractionated to obtain a plasticizer oil containing the dinuclear ester, trinuclear hydrocarbon, the trinuclear ester, and the quadrinuclear hydrocarbon represented as C, D, E, and F in the analysis. This plasticizer had an analyzer as follows:

TABLE III

| Compound: | Wt. percent |
|---|---|
| C | 58.1 |
| D | 25.1 |
| E | 13.3 |
| F | 3.5 |
| Ester/hydrocarbon ratio | 2.5 |

*Example 2*

An admixture of 196 g. (1 mol) of ditolylmethane, 30 g. (1 mol) of paraformaldehyde (180 to 3000 molecular weight), and 60 g. (1 mol) of glacial acetic acid was formed in 500 cc. stirred reaction flask and heated to 100° C. To this was added dropwise over a period of From Table IV it is seen that at the end of 30 minutes no appreciable reaction has taken place, at least to the extent of forming anything other than a small amount of Compound C, ditolylmethanemethylol acetate. At the end of 1 hour, however, the reaction has proceeded sufficiently to form 6% of the ditolylmethanemethylol acetate, and at the end of 2 hours the reaction is well underway. At the end of a 4-hour period, 18.5% of the reaction mixture is ditolylmethanemethylol acetate, with the ester-to-hydrocarbon ration of about 4.5. However, at the end of 6 hours reaction time, it is seen that the ester-to-hydrocarbon ratio has decreased to 3.0. This is due to the fact that virtually no additional ester has been formed while both the 3 and 4-ring hydrocarbons have been increased in concentration. Thus, the process for optimizing the ester-to-hydrocarbon ratio should proceed at least 1 hour and should not exceed 4 hours in duration.

Having disclosed in detail the essence of the present invention, and the best mode contemplated of carrying out the invention, what is desired to be protected by Letters Patent should be limited not by the specific examples herein given, but rather only by the appended claims.

I claim:
1. In a process for producing a plasticizer oil in which toluene is reacted with formaldehyde in a first-stage reactor in the presence of an acid catalyst and under conditions chosen to optimize the production of ditolylmethane, the steps of
   recovering a ditolylmethane product stream from said first-stage reactor,
   reacting one molar part of said ditolylmethane in a second-stage reactor in admixture with from 0.5 to 1.5 molar parts of glacial acetic acid, 0.5 to 2.0 molar parts of formaldehyde, and 0.1 to 0.5 molar part of 40 to 70 weight percent sulfuric acid,
   under reaction conditions including a temperature of 75° C. to 150° C. and a total reaction time of 1 to 4 hours,
   to obtain a second-stage reaction product,
   and distilling said reaction product to obtain a plasticizer oil boiling above 200° C. at 20 mm. pressure and having an ester-to-hydrocarbon ratio in excess of 3.5.
2. A method in accordance with claim 1 wherein the acetic acid, formaldehyde, and ditolylmethane are admixed in said second reaction zone, and the sulfuric acid added thereto over a period of 1 to 2 hours.
3. In a process for producing a plasticizer oil the steps of reacting in admixture in a reaction zone one molar part of ditolylmethane, from 0.5 to 1.5 molar parts of glacial acetic acid, 0.5 to 2.0 molar parts of formaldehyde, and 0.1 to 0.5 molar part of 40 to 70 weight percent sulfuric acid,
under reaction conditions including a temperature of 75° C. to 150° C. and a total reaction time of 1 to 4 hours, to obtain a reaction product,
and distilling said reaction product to obtain a plasticizer oil boiling above 200° C. at 20 mm. pressure and having an ester-to-hydrocarbon ratio in excess of 3.5.

4. A method in accordance with claim 3 wherein the acetic acid, formaldehyde, and ditolylmethane are first admixed in said reaction zone and the sulfuric acid added thereto over a period of 1 to 2 hours.

References Cited by the Examiner

UNITED STATES PATENTS 2,761,884   9/1956   Koorevaar _____ 260—668

LORRAINE A. WEINBERGER, *Primary Examiner.*

V. GARNER, *Assistant Examiner.*